United States Patent [19]

Huggins et al.

[11] Patent Number: 5,258,435
[45] Date of Patent: Nov. 2, 1993

[54] PALLADIUM-CONTAINING POLYMER COMPOSITION AND A PROCESS FOR ITS PREPARATION

[75] Inventors: John M. Huggins, Leverkusen; Achim Wolfgarten, Köln, both of Fed. Rep. of Germany

[73] Assignee: Bayer Aktiengesellschaft, Leverkusen, Fed. Rep. of Germany

[21] Appl. No.: 848,452

[22] Filed: Mar. 9, 1992

[30] Foreign Application Priority Data

Mar. 13, 1991 [DE] Fed. Rep. of Germany ....... 4108032

[51] Int. Cl.$^5$ .................................. C08K 3/08
[52] U.S. Cl. .................... 524/357; 385/141; 524/398; 524/403
[58] Field of Search ............ 523/459, 125, 126; 524/440, 403, 398, 357, 588; 428/407; 526/103; 385/141

[56] References Cited

U.S. PATENT DOCUMENTS

| | | | |
|---|---|---|---|
| 3,142,655 | 7/1964 | Bobear | 524/588 |
| 3,427,264 | 2/1969 | Foster et al. | 524/440 |
| 3,525,635 | 8/1970 | Haller | 428/461 |
| 3,994,855 | 11/1976 | Boberg | 523/126 |
| 4,519,941 | 5/1985 | Anderson | 524/440 |
| 4,688,889 | 8/1987 | Pasini et al. | 385/109 |
| 4,718,747 | 1/1988 | Bianchi et al. | 385/109 |
| 4,725,122 | 2/1988 | Anelli et al. | 385/141 |
| 4,725,123 | 2/1988 | Anelli et al. | 385/141 |
| 4,741,592 | 5/1988 | Secco et al. | 385/141 |
| 4,871,790 | 10/1989 | Lamanna et al. | 524/440 |
| 4,888,248 | 12/1989 | Hirai et al. | 428/403 |
| 5,140,664 | 8/1992 | Bosisio et al. | 385/141 |
| 5,150,444 | 9/1992 | Bosisio et al. | 385/109 |

FOREIGN PATENT DOCUMENTS

| | | | |
|---|---|---|---|
| 200914 | 12/1986 | European Pat. Off. | |
| 217066 | 4/1987 | European Pat. Off. | |
| 1297669 | 6/1969 | Fed. Rep. of Germany . | |
| 2588388 | 4/1987 | France . | |
| 60-145938 | 8/1985 | Japan | 524/403 |
| 2144559 | 3/1985 | United Kingdom . | |
| 2167424 | 5/1986 | United Kingdom . | |

OTHER PUBLICATIONS

Journal of Macromolecular Science, vol. 13(6), 727-50 (1979).
World Patents Index Latest, AN 90-323392 & JP-A-2 229 268, Sep. 12, 1990.

*Primary Examiner*—Veronica P. Hoke
*Attorney, Agent, or Firm*—Sprung Horn Kramer & Woods

[57] ABSTRACT

The present invention relates to new palladium-containing polymer compositions which are characterized by a very finely disperse distribution of metallic palladium, and to the process for their preparation. Palladium-containing polymer compositions containing polymers with unsaturated groups are used inter alia as hydrogen absorbent compositions in the production of fibre optic cables for the purpose of protecting the optical fibres against hydrogen. As is well known, the diffusion of hydrogen into optical fibres has an adverse effect on the damping properties of the optical fibres.

11 Claims, No Drawings

PALLADIUM-CONTAINING POLYMER COMPOSITION AND A PROCESS FOR ITS PREPARATION

The present invention relates to new palladium-containing polymer compositions which are characterised by a very finely disperse distribution of metallic palladium, and to the process for their preparation. Palladium-containing polymer compositions containing polymers with unsaturated groups are used inter alia as hydrogen absorbent compositions in the production of fibre optic cables for the purpose of protecting the optical fibres against hydrogen. As is well known, the diffusion of hydrogen into optical fibres has an adverse effect on the damping properties of the optical fibres.

Hydrogen absorbent compositions consisting of unsaturated organic polymers or unsaturated silicone polymers and transition metals or transition metal compounds as hydrogenation catalysts have already been disclosed (EP-A 200 914, GB-A 2 167 424).

Hydrogen absorbent compositions based on hydrogen absorbent metals or metal compounds have also been described (DE-A 3 515 227, DE-A 3 515 228, FR-A 2 588 388, EP-A 217 066 and GB-A 2 144 559).

These known hydrogen absorbent compositions have, however, various disadvantages. Some compositions require large quantities of expensive metals or metal compounds, for example palladium powders in quantities of at least 0.2% by weight. Other compositions are only moderately active in their hydrogen absorption. Although the hydrogen absorption capacity of polymers containing unsaturated groups is determined mainly by the number of unsaturated groups, the effectiveness of such hydrogen absorbent compositions in protecting the optical fibres is to a large extent determined by the initial rate of the hydrogen absorption since the major proportion of the hydrogen which is required to be taken up by the hydrogen absorbent compounds is already present during manufacture of the fibre-optic cable. Compared with this, the hydrogen which subsequently diffuses into the cable from its surroundings is only of minor importance. There is therefore a technological requirement for hydrogen absorbent compositions which have a high initial hydrogen absorption activity.

The present invention provides inter alia new hydrogen absorbent polymer compositions which are distinguished by a very high hydrogen absorption activity even with very low palladium contents. This high activity is attributed to the very finely dispersed distribution of the palladium in the polymer. It was found that in the polymer compositions according to the invention, the metallic palladium is present in colloidal distribution, and according to the invention, at least 50% of the palladium present in the polymer is in the form of colloidal particles having a particle size of less than 0.5 $\mu$m in diameter. Preferably, at least 50% by weight of the palladium has a particle size below 0.2 $\mu$m in diameter.

The process according to the invention for the preparation of the palladium-containing polymer compositions consists, in its most general form, in that a palladium compound is mixed with the polymer in a first step of the process and the palladium compound distributed in the polymer is then at least partially reduced to metallic palladium in a second step of the process. It is a particular feature of the process according to the invention that it is carried out in the absence of water.

The polymer composition obtained in the second stage, containing colloidally distributed palladium, may still have relatively high palladium contents of up to 50,000 ppm and generally does not yet contain the quantity of unsaturated groups required to render the polymer composition suitable as hydrogen absorbing agent. A certain quantity of unsaturated groups in the polymer used in Stage 1, however, appears to be advantageous for uniform distribution of the palladium in the polymer. If, however, the proportion of unsaturated groups is too high, reduction in the second stage will be inhibited. The amount of unsaturated groups in the polymer used in Stage 1 is preferably less than 0.2 mmol/g of polymer, most preferably less than 0.1 mmol/g of polymer. It would be possible in principle to use the product obtained from Stage 2 as hydrogen absorbing polymer composition, either if only small quantities of hydrogen are to be absorbed or if disadvantages in the reduction due to excessively large quantities of unsaturated groups are acceptable.

A preferred embodiment according to the invention includes a third stage in which the polymer composition containing colloidal palladium is mixed in one or more steps with another polymer containing unsaturated groups, whereby the polymer composition acquires sufficient capacity for hydrogen absorption.

The third stage of the process may suitably be carried out immediately prior to the production of the fibre-optic cable in the factory of the cable manufacturer. The product obtained in Stage 2 is thus a valuable preliminary product for the fibre-optic industry.

The palladium-containing polymer compositions from Stage 2 should be liquid in consistency so that they can undergo further mixing in Stage 3. Their viscosity may be from 5 to 2,000,000 mPa.s but is preferably from 100 to 100,000 mPa.s (viscosity figures are based on a temperature of 25° C.). The hydrogen absorbent polymer compounds from Stage 3 are suitable for processing in fibre-optic cables if they have viscosities of from 5 to 2,000,000 mPa.s, preferably from 1000 to 1,000,000 mPa.s. The viscosity can be adapted to the given operating conditions of the cable manufacturer by suitable choice of the polymer.

In the context of the present invention, the polymers may be chosen so that a cross-linkable polymer composition (a rubber) is obtained in the third stage. The two components for the cross-linking reaction may be added during the 3rd stage or one component may already be present in the first stage while the 2nd component is added during the 3rd stage. The important condition is that the rubber should contain a sufficient excess of unsaturated groups for hydrogen absorption so that a sufficient number of hydrogen absorbing groups will still be present after the cross-linking reaction.

If the palladium-containing polymer composition is a rubber, a cross-linking reaction may be carried out after the optical fibre has been covered with the rubber, and it may be carried out in the presence of a catalyst.

One advantageous procedure for protecting fibre-optic cables may consist in using a palladium-containing rubber according to the invention and first leaving this in its viscous structure in order to ensure a high initial hydrogen absorption.

In view of the limited storage stability of the rubber, this has the advantage that the cross-linking reaction then only sets in gradually, so that finally, when the major proportion of the hydrogen carried into the cable during its production and otherwise taken in has been absorbed, the palladium-containing polymer composition is present as an elastomer, which has the added effect of providing mechanical protection to the optical fibre.

In order to obtain uniform mixing in the third stage, the ratio of polymer used in Stage 1 to the polymer used in Stage 3 should be from 1:20 to 1:3. If desired, mixing of the palladium compound with the first polymer in Stage 1 and addition of the second polymer in Stage 3 may each be carried out in several steps. A ratio of from 1:2 to 1:10 may be regarded as optimal for obtaining uniform mixing in each step.

According to the invention, palladium(II) compounds corresponding to the general formula $PdX_2$ are preferably used, X being selected from Cl, Br, $O_2CR$ or 2,4-pentanedionato groups and R denoting an organic group having 1 to 20 carbon atoms. Examples include palladium(II) chloride, palladium(II) bromide, palladium(II) acetate, palladium(II)(2-ethylhexanoate) and palladium(II)(2,4-pentanedionate). Pd(II) compounds of the formula $Pd(II)(O_2CR)_2$ are particularly preferred.

The polymers used in the first stage of the process may be any polymers which have no deleterious effect on the optical fibre, still have a suitable viscosity for mixing in Stage 1 and in Stage 3 and do not interfere with the reduction of palladium carried out after Stage 1. Examples of suitable polymers include polyolefins obtained, for example, by homo- or copolymerisation of unsaturated hydrocarbons having 2 to 8 carbon atoms, e.g. polyethylene, polypropylene, ethylene/propylene copolymers or polyisobutylene. Silicone polymers are also suitable, especially diorganopolysiloxanes which are triorgano-end stopped, in which the organo groups may be methyl, ethyl or phenyl, independently of one another. The polymers used in Stage 1 may advantageously already contain a certain number of unsaturated groups such as vinyl or allyl.

The above-mentioned palladium(II) compounds may be dissolved in the first stage by mixing as such with the polymer. It may be advantageous, depending on the compatibility of the palladium(II) compound with the polymer, first to dissolve the palladium(II) compound in an inert organic solvent and then to mix it with the polymer. Examples of suitable solvents include ethers and aliphatic, aromatic or chlorinated hydrocarbons, e.g. toluene. Mixing should be as intimate as possible so that the palladium compound can be dissolved very homogeneously in the polymer. It may be advantageous to dissolve the palladium(II) compound together with another reactive compound in order to improve its solubility. The reactive compound used for improving the solubility is preferably a compound containing a carboxyl or primary, secondary or tertiary amino group. Aliphatic carboxylic acids such as 2-ethylhexanoic acid or the like are particularly preferred. If the polymer used is a polysiloxane, amino functional silanes or siloxanes having at least one functional group may also be used to improve the solubility, e.g. compounds corresponding to the following general formula

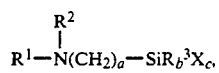

(I)

wherein $R^1$ and $R^2$ denote, independently of one another, hydrogen or alkyl, cycloalkyl or aryl groups having not more than 15 carbon atoms and $R^3$ denotes methyl or phenyl or X denotes alkoxy or $O_{\frac{1}{2}}$ groups and a=1 to 4, b=0 to 3 and c=3 minus b.

When the palladium compound has dissolved in the polymer, the palladium(II) compound is at least partially reduced to metallic palladium in a second stage of the process. Reduction may be carried out by exposing the polymer mixture obtained in Stage 1 to a hydrogen atmosphere. For example, the polymer mixture may be exposed to the hydrogen atmosphere for several days at room temperature and normal pressure. A more rapid reduction is obtained if the polymer is exposed to hydrogen at elevated pressure and optionally with stirring. Subsequent brief degasification may then be advantageous. The reducing agents used are preferably silicones containing Si—H groups as represented by the following general formula

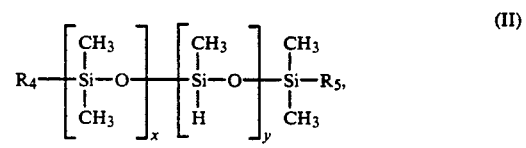

(II)

wherein $R_4$ and $R_5$ denote, independently of one another, a hydrogen or methyl group, x has a value from zero to 300 and y has a value from 1 to 300 and the sum of x and y is from 10 to 300.

The number of Si—H groups in the silicone is preferably from 0.05 to 16 mmol/g. Monomeric silanes containing Si—H groups may also be used as reducing agents. Examples include tributylsilane, triethylsilane, trihexylsilane and the like. If organic polymers which are not readily miscible with silicones are used in Stage 1, the Si—H-containing silicones may also contain relatively long chain organo groups or phenyl groups to improve the solubility in the organic polymer.

There is no disadvantage in adding the Si—H-containing compound to the polymer already before the latter is mixed with the palladium(II) compound. The Si—H-containing compound is used in a quantity of from 0.5 to 50, preferably from 1 to 30 Si—H equivalents per mol of palladium(II) compound. Reduction is carried out at temperatures from about 20° C. to below the decomposition temperature of the reactants. The reduction preferably takes place at a slightly elevated temperature, i.e. from about 20° to 80° C., most preferably from 20° to 30° C.

According to the invention, the palladium compound is preferably used in such a quantity that the polymer will have a metallic palladium content of from 1 to 50,000 ppm (by weight), most preferably from 10 to 1000 ppm.

If a solvent is used for dissolving the palladium compound in the polymer, it is preferably removed by evaporation before or after the reduction.

In the third stage of the process, the palladium-containing polymer obtained from the second stage of the process is mixed with the polymer containing unsaturated groups. The polymers containing unsatugroups may be homo- or copolymers of conjugated dienes. Such polymers containing unsaturated groups may be obtained by the polymerisation of monomers such as butadiene, pentadiene, methyl butadiene, isoprene or 2-chlorobutadiene. Copolymers are preferably obtained by the polymerisation of a first monomer, e.g. selected from butadiene, pentadiene, methylbutadiene or chlorobutadiene, with a second monomer, e.g. selected from styrene, 4-vinylpyridine and acrylonitrile. Terpolymers are also suitable, e.g. butadiene/styrene/acrylonitrile terpolymers. Graft polymers of the above-mentioned homo-, co- or terpolymers with other unsaturated groups, e.g. with divinylsulphone or vinyl crotonate, are also suitable. Natural rubber is also suitable. Silicone polymers containing unsaturated groups are particularly preferred by virtue of their good permeability to gases and good flow properties over a wide temperature range. These silicone polymers may contain from cyclic, linear or branched structures and combinations thereof.

The silicone polymers according to the invention preferably correspond to the following general formula

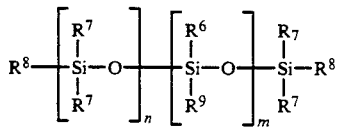

wherein
$R^6$ and $R^7$ denote, independently of one another, methyl, ethyl or phenyl,
$R^8$ and $R^9$ denote, independently of one another, methyl, vinyl, allyl or phenyl,
$n = 0$ to 2000 and
$m = 0$ to 1000 and
$m + n = 300$ to 2000.

Silicone polymers corresponding to the following formulae are particularly preferred:

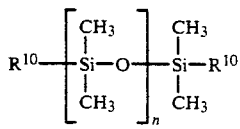

or

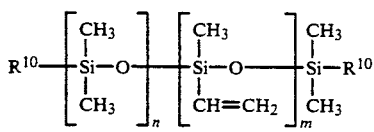

wherein
$R^{10}$ = methyl or vinyl,
$n = 0$ to 2000 and
$m = 1$ to 500 and
$n + m = 300$ to 2000.

The polymers according to the invention are preferably liquid. They preferably have viscosities of from 5 to 2,000,000 mPa.s at 25° C. Those having viscosities of from 1000 to 100,000 mPa.s at 25° C. are particularly preferred. The polymers according to the invention may have saturated or unsaturated structures but the polymer mixture used must contain a total of at least 0.2 mmol/100 g of unsaturated organic groups. The palladium(II) compound is preferably dissolved in a polymer having less than 10 mmol per 100 g of unsaturated organic groups. A further quantity of unsaturated polymer is in that case preferably added after reduction in order to adjust the amount of unsaturated groups to the required level. Compositions having a total of from 5 to 300 mmol of unsaturated organic groups per 100 g of polymer are preferred.

Other reducing agents may be used (less preferred) instead of SiH compounds, e.g. metal hydrides such as $(C_2H_5)_2N.BH_3$ or lithium tri-tert.-butoxyaluminium hydride if they have no deleterious effects for the purposes for which the products are to be used.

The palladium-containing compositions obtained as described above have hydrogen absorption activities which are much higher than those of compositions which are prepared only by mixing unsaturated polymers with palladium powder, palladium supported on inert solids or palladium(II) compounds. In the process according to the invention, the palladium(II) compound is reduced in the form of a homogeneous solution. This results in a specially reactive highly disperse palladium dispersion.

The palladium content of the hydrogen absorbing polymer is below 10,000 ppm, preferably from 30 to 500 ppm, most preferably from 50 to 300 ppm.

The palladium-containing compositions according to the invention are suitable for use in light conductor cables. The rates of hydrogen absorption vary according to the palladium content and the number of unsaturated groups but very high activities can be obtained with very small quantities of palladium in the process according to the invention, e.g. from 400 to 1500 ml $H_2$/mol of Pd-sec. The total quantity of hydrogen absorbed is determined mainly by the number of unsaturated groups.

The invention will now be further described with the aid of the following Examples.

EXAMPLES

General

The following silicone polymers were used in the Examples.

Polymer A:
A trimethylsiloxy end-stopped dimethylsiloxane having a viscosity of 5000 mPa.s at 25° C.

Polymer B:
A vinyldimethylsiloxy end-stopped polydimethylsiloxane having a viscosity of 4,500 mPa.s at 25° C. and containing 0.07 mmol/g of vinyl groups.

Polymer C:
A vinyldimethylsiloxy end-stopped dimethylsiloxy/methyl vinylsiloxy copolymer having a viscosity of 4,300 mPa.s at 25° C. and containing 0.75 mmol/g of vinyl groups.

Polymer D:
A trimethylsiloxy end-stopped polymethyl(hydrogen)siloxane having a viscosity of 15 mPa.s at 25° C. and containing 15 mmol/g of Si—H groups.

Polymer E:
A trimethylsiloxy end-stopped dimethylsiloxy/methyl(hydrogen)siloxy copolymer having a viscosity of 30 mPa.s at 25° C. and containing 4.5 mmol/g of Si—H groups.

EXAMPLE 1

45 mg (0.115 mmol) of Palladium(II)(2-ethylhexanoate) were dissolved in 20 g of Polymer B in a 250 ml polyethylene beaker. 270 mg (1.21 mmol of SiH) of Polymer E were then added and the mixture was left to stand at 23° C. for 24 hours. During this time, the yellow solution turned brown. 80 g of Polymer C were then added. The product was obtained as a light brown oil.

Analysis: 120 ppm Pd.

The hydrogen absorption was determined as follows: 5 g of the palladium-containing oil were introduced into a 250 ml one-necked flask together with a magnetic stirrer. The flask was evacuated by means of a vacuum pump and filled with hydrogen and then connected to an apparatus for measuring the change in volume at normal pressure. The rate of change of volume was observed. The results are shown in Table 1.

EXAMPLE 2

A) 850 mg (3.8 mmol) of palladium(II) acetate and 1.37 g (9.5 mmol) of 2-ethylhexanoic acid were dissolved in 20 g of toluene at 25° C. in a 100 ml one-necked flask. 15 g of polymer A were then added and the toluene was distilled off at 60° C. and 30 mbar. A red oil containing 2.28% by weight of palladium was obtained.

B) 440 mg (0.094 mmol of Pd) of the oil obtained in (A) and 5 g of Polymer B were mixed together in a 250 ml polyethylene beaker. 200 mg (0.9 mmol of SiH) of Polymer E were then added and the contents of the beaker were mixed for one minute in a dough mixer. The mixture, which was initially yellow, became dark brown after 3 hours. The mixture was mixed with 45 g of Polymer B and 50 g of Polymer C. The product was obtained as a brown, homogeneous oil.

Analysis: 100 ppm Pd.

The oil exhibited strong light scattering, which indicates very finely dispersed distribution of the palladium in the form of colloidal particles. No particles larger than 0.2 µm in diameter were detected by optical microscopy or confocal laser scan microscopy.

C) 2.2 g (0.47 mmol of Pd) of the oil obtained in (A) and 25 g of Polymer B were mixed in a 250 ml polyethylene beaker. 1.0 mg of Polymer E (4.5 mmol of SiH) were then added and the components were mixed for one minute. A further 5 g of Polymer B and 50 g of Polymer C was added after 3 hours. The product was obtained as a dark brown, homogeneous oil.

Analysis: 670 ppm Pd.

D) 550 mg (0.125 mmol of Pd) of the oil obtained in (A) and 5.6 g of Polymer B were mixed in a 250 ml polyethylene beaker. 275 mg of Polymer E (1.15 mmol of SiH) were then added. 93.5 g of Polymer B were added after one hour at 23° C. The product was obtained as a brown, homogeneous oil.

Analysis: 130 ppm Pd.

E) 440 mg (0.094 mmol of Pd) of the oil obtained in (A) and 5 g of Polymer A were mixed in a 250 ml one-necked flask. The mixture was then reduced in a hydrogen atmosphere at 25° C. for 66 hours. 40 ml of $H_2$ were taken up during this time. 95 g of Polymer C were then added. The product was obtained as a dark grey oil. When it was left to stand, a fine black precipitate formed.

Analysis: 50 ppm Pd.

The hydrogen absorption of (b), (c), (d) and (e) was determined as in Example 1. The results are shown in Table 1.

EXAMPLE 3

46.5 g of Polymer B, 50 g of Polymer C and 3.5 g of a fume silica having a specific surface area of 150 $m^2/g$ were mixed together in a 250 ml three-necked flask equipped with stirrer and water cooler. 0.1 g (0.45 mmol) of 3-ainopropyl-triethoxysilane was then added and the mixture was stirred at 25° C. for 1.5 hours and 60° C. for 15 minutes at 30 mbar. A solution of 27 mg (0.12 mmol) of palladium(II) acetate in 5 g of toluene was prepared and added. 20 mg (0.3 mmol of SiH) of Polymer D were added after 15 minutes and the mixture was stirred at 60° C. for 3 hours. The toluene was distilled off at 60° C. and 30 mbar. The product was obtained as a dull grey paste.

Analysis: 180 ppm Pd.

Hydrogen absorption was determined as in Example 1. The results are shown in Table 1.

EXAMPLE 4

A) 9 g (40 mmol) of palladium(II) acetate were dissolved in 150 ml of toluene in a 500 ml one-necked flask. 120 g of a polydimethylsiloxane containing 0.82 mmol/g of (cyclohexylamino)methyldimethylsiloxy groups and having a viscosity of 55 mPa.s (25° C.) were then added. The toluene was drawn off at 30° C. and 1 mbar after 2 hours. A light brown oil having a viscosity of 650 mPa.s at 25° C. and containing 3.14% by weight of palladium was obtained in a quantity of 130 g.

B) 320 mg (0.1 mmol) of the oil obtained in (A) were mixed with 20 g of Polymer B in a 250 ml polyethylene beaker. 260 mg of Polymer E (1.1 mmol of SiH) were then added and the mixture was left to stand at 60° C. for 3 days. 80 g of Polymer C were then added. The product was obtained as a light brown, homogeneous oil.

Analysis: 100 ppm Pd.

Hydrogen absorption was determined as in Example 1. The results are shown in Table 1.

EXAMPLE 5

Comparison Example Without Reduction

A palladium-containing silicone composition was prepared by dissolving a palladium(II) compound in the silicone polymer but it was not reduced.

480 mg (0.1 mmol of Pd) of the oil obtained in 3 (A) were mixed with 50 g of Polymer B and 50 g of Polymer C in a 500 ml polyethylene beaker. The product was obtained as a pale yellow, homogeneous oil.

Analysis: 120 ppm Pd.

Hydrogen absorption was determined as in Example 1. The results are shown in Table I.

EXAMPLE 6

Comparison Example with Palladium on Charcoal 50 g of Polymer B and 50 g of Polymer C were mixed in a 250 ml polyethylene beaker with 200 mg of palladium on active charcoal having a concentration of 5 g of palladium per 100 g of active charcoal. The mixture was obtained as a black oil.

Hydrogen absorption was determined as in Example 1. The results are shown in Table 1. They show that by comparison with Example 2(B) and 3, a smaller number of ml of $H_2/g$ is absorbed for a given SiVi content and compared with 3(B) a smaller number of ml of H₂/mol Pd per sec is absorbed at a given palladium concentration.

TABLE 1

| | | Hydrogen absorption at 1000 mbar H₂ and 25° C. | | | | |
|---|---|---|---|---|---|---|
| | | mmol/g | ml H₂/ | \multicolumn{3}{c}{ml H₂/g} |
| Example | ppm Pd | SiVi[a] | mol Pd-sec[b] | 1 h | 3 h | 24 h |
| 1 | 120 | 0.615 | 1520 | 6.2 | 11.9 | —[e] |
| 2B | 100 | 0.41 | 1420 | 4.8 | 7.3 | 12 |
| 2C | 670 | 0.49 | 255 | 5.8 | 9.0 | — |
| 2D | 130 | 0.07 | 432 | 1.9 | 2.4 | — |
| 2E | 50 | 0.71 | 709 | 1.2 | 2.6 | 6.2 |
| 3 | 180 | 0.41 | 394 | 2.4 | 3.5 | — |
| 4 | 100 | 0.615 | 440 | 1.5 | 3.8 | — |
| 5[c] | 120 | 0.41 | 0 | 0 | 0[d] | — |
| 6[f] | 100 | 0.41 | 355 | 1.2 | 2.82 | 4.3 |

[a]Calculated from the polymer mixture,
[b]after 1 h,
[c]Comparison Example in which the palladium (II) compound was not reduced
[d]no detectable hydrogen adsorption after 3 h
[e]—: no measurement
[f]comparison Example with Pd/C.

We claim:

1. Palladium-containing water-free polymers characterized by containing from 1 to 50,000 ppm by weight of metallic palladium in colloidal distribution, at least 50% by weight of palladium being in the form of colloidal particles having a particle diameter of less than 0.5 μm wherein the polymers are selected from the group consisting of polyolefins and silicone polymers that optionally contain vinyl or allyl groups.

2. A process for the preparation of the polymers according to claim 1, characterised in that a Pd compound is dissolved in the polymer and the Pd compound is then reduced in the polymer.

3. A process according to claim 2, characterised in that the palladium compound used is a palladium(II) compound corresponding to the formula $$PdX_2$$

wherein X=Cl, Br, O₂CR or 2,4-pentanedionato groups and R denotes a C-1 to C-20 organic group.

4. A process according to one of the claim 2 characterised in that the palladium(II) compound is dissolved in one or more polymers together with a reactive compound containing at least one carboxyl group or primary, secondary or tertiary amino group.

5. A process according to one of the claim 2 characterised in that the palladium(II) compound dissolved in the polymer is reacted under such conditions with hydrogen or with an Si—H-containing compound having at least one hydrogen atom attached to a silicon atom that at least part of the palladium(II) compound is reduced.

6. A process according to one of the claim 2 characterised in that there is used at least one silicone polymer corresponding to the following general formula

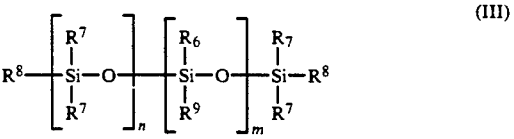
(III)

wherein R⁶ and R⁷ denote, independently of one another, methyl, ethyl or phenyl; R⁸ and R⁹ denote, independently of one another, methyl, vinyl, allyl or phenyl; n=0 to 2000 and m=0 to 1000 and n+m=300 to 2000.

7. Hydrogen absorbing water-free polymer composition comprising (A) polymers selected from the group consisting of homo or copolymers of conjugated dienes, natural rubber, and silicone polymers containing at least 0.2 mmol/100 g of unsaturated groups; (B) polymers selected from the group consisting of polyolefins and silicone polymers that optionally contain vinyl or allyl groups, and (C) from 1 to 50,000 ppm metallic palladium in colloidal distribution wherein at least 50% by weight of the palladium is in the form of colloidal particles having particle diameter of less than 0.5 μm.

8. Hydrogen absorbing water-free polymer composition according to claim 7 wherein (C) contains from 30 to 500 ppm metallic palladium.

9. Hydrogen absorbing water-free polymer composition according to claim 7 wherein (c) contains from 50 to 300 ppm metallic palladium.

10. A process for the preparation of hydrogen absorbing polymer compositions according to claim 7, characterised in that palladium-containing polymers selected from the group consisting of polyolefins and silicone polymers that optionally contain vinyl or allyl groups are mixed with polymers selected from the group consisting of homo-or copolymers of conjugated dienes, natural rubber, and silicone polymers containing unsaturated groups wherein the palladium-containing polymers are selected from the group consisting of polyolefins and silicone polymers that optionally contain vinyl or allyl groups wherein the palladium-containing polymer contains from 30 to 10,000 ppm by weight of metallic palladium in colloidal distribution, at least 50% by weight of palladium being in the form of colloidal particles having a particle diameter of less than 0.5 μm.

11. A process according to claim 10, characterised in that there is used at least one silicone polymer containing unsaturated groups as represented by the general formula (III)

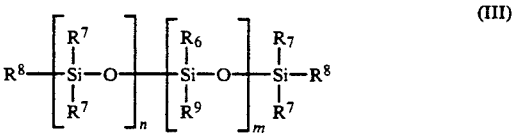
(III)

wherein R⁶ and R⁷ denote, independently of one another, methyl, ethyl or phenyl, R⁸ and R⁹ denote, independently of one another, methyl, vinyl, allyl or phenyl, n=0 to 2000 and m=0 to 1000 and n+m=300 to 2000 and the polymer or polymer mixture contains a total of at least 0.2 mmol/100 g of unsaturated groups.

* * * * *

UNITED STATES PATENT AND TRADEMARK OFFICE
CERTIFICATE OF CORRECTION

PATENT NO. : 5,258,435
DATED : November 2, 1993
INVENTOR(S) : Huggins, et al.

It is certified that error appears in the above-identified patent and that said Letters Patent is hereby corrected as shown below:

Col. 9, line 47    Delete " one of the "

Col. 9, line 53    Delete " one of the "

Col. 9, line 61    Delete " one of the "

Signed and Sealed this

Eleventh Day of July, 1995

*Attest:*

BRUCE LEHMAN

*Attesting Officer*    *Commissioner of Patents and Trademarks*